(12) United States Patent
Yamashita et al.

(10) Patent No.: US 8,035,792 B2
(45) Date of Patent: Oct. 11, 2011

(54) LIQUID CRYSTAL DISPLAY DEVICE HAVING SPACERS WITH DIFFERENT COEFFICIENTS OF ELASTICITY PER UNIT AREA GRADUALLY DECREASING ALONG THE LENGTH OF THE DISPLAY PANEL

(75) Inventors: Hidefumi Yamashita, Yokohama (JP); Hideaki Kunieda, Moriyama (JP)

(73) Assignee: Chimei Innolux Corporation, Miao-Li County (TW)

( * ) Notice: Subject to any disclaimer, the term of this patent is extended or adjusted under 35 U.S.C. 154(b) by 1010 days.

(21) Appl. No.: 11/058,604

(22) Filed: Feb. 14, 2005

(65) Prior Publication Data

US 2006/0181668 A1    Aug. 17, 2006

(51) Int. Cl.
*G02F 1/1339* (2006.01)

(52) U.S. Cl. ............... 349/157; 349/155; 349/156
(58) Field of Classification Search ......... 349/12, 349/141, 155–159
See application file for complete search history.

(56) References Cited

U.S. PATENT DOCUMENTS

| | | | | |
|---|---|---|---|---|
| 4,256,382 A * | 3/1981 | Piliavin et al. | ............ | 349/153 |
| 4,973,138 A * | 11/1990 | Yamazaki et al. | ............ | 349/157 |
| 4,983,023 A * | 1/1991 | Nakagawa et al. | ............ | 349/157 |
| 5,142,395 A * | 8/1992 | Yamazaki et al. | ............ | 349/157 |
| 5,268,782 A * | 12/1993 | Wenz et al. | ............ | 349/156 |
| 5,668,617 A | 9/1997 | Na | | |
| 6,013,339 A | 1/2000 | Yamada et al. | | |
| 6,184,967 B1 * | 2/2001 | Lagerwall et al. | ............ | 349/155 |
| 6,226,067 B1 * | 5/2001 | Nishiguchi et al. | ............ | 349/155 |
| 6,292,249 B1 * | 9/2001 | Kane et al. | ............ | 349/155 |
| 6,521,475 B1 | 2/2003 | Chen et al. | | |
| 6,678,030 B2 * | 1/2004 | Imabayashi et al. | ............ | 349/155 |
| 6,734,944 B1 * | 5/2004 | Koseki et al. | ............ | 349/155 |
| 6,788,381 B2 * | 9/2004 | Hachisu et al. | ............ | 349/172 |
| 6,829,070 B2 | 12/2004 | Adachi | | |
| 7,061,457 B2 | 6/2006 | Minami | | |
| 7,253,868 B2 * | 8/2007 | Lee et al. | ............ | 349/155 |
| 2002/0008827 A1 * | 1/2002 | Yoo et al. | ............ | 349/141 |
| 2002/0085160 A1 | 7/2002 | Ha et al. | | |
| 2002/0171799 A1 * | 11/2002 | Bayrle et al. | ............ | 349/155 |
| 2004/0114087 A1 * | 6/2004 | Cho et al. | ............ | 349/155 |
| 2004/0130671 A1 * | 7/2004 | Byun et al. | ............ | 349/156 |
| 2005/0151917 A1 * | 7/2005 | Chen | ............ | 349/144 |

FOREIGN PATENT DOCUMENTS

| | | |
|---|---|---|
| CN | 1427285 | 7/2003 |
| CN | 1480977 | 3/2004 |
| EP | 0 730 188 | 9/1996 |
| GB | 2 332 953 | 7/1999 |
| JP | 11-194350 | 7/1999 |

(Continued)

OTHER PUBLICATIONS

English language translation of abstract of TW 373094.

(Continued)

*Primary Examiner* — Jessica M Merlin
(74) *Attorney, Agent, or Firm* — Thomas|Kayden (57) ABSTRACT

One embodiment, among others, of an LCD panel includes an array substrate, a CF substrate facing the array substrate and offset by a cell gap from the array substrate, a plurality of spacers positioned on the array substrate or the CF substrate for maintaining the cell gap and supporting the array substrate and the CF substrate, and liquid crystal molecules sealed between the array substrate and the CF substrate. The spacers have different coefficients of elasticity per unit area. Other embodiments are included.

17 Claims, 11 Drawing Sheets

FOREIGN PATENT DOCUMENTS

| | | |
|---|---|---|
| JP | 2000-321580 | 11/2000 |
| JP | 2002037325 | 2/2002 |
| JP | 2003-255354 | 9/2003 |
| JP | 2003-322861 | 11/2003 |
| KR | 2002-0056115 | 7/2002 |
| TW | 373094 | 10/1984 |
| TW | 556848 | 8/1988 |

OTHER PUBLICATIONS

English language translation of abstract of JP 2002037325.
English language translation of abstract of JP 2003-322861 (published Nov. 14, 2003).
English language translation of abstract of JP 2003-255354 (published Sep. 10, 2003).

\* cited by examiner

LIQUID CRYSTAL DISPLAY DEVICE HAVING SPACERS WITH DIFFERENT COEFFICIENTS OF ELASTICITY PER UNIT AREA GRADUALLY DECREASING ALONG THE LENGTH OF THE DISPLAY PANEL

BACKGROUND OF INVENTION

1. Field of the Invention

The present disclosure relates to a liquid crystal display (LCD) panel, and more particularly, to a high quality LCD panel having an even cell gap.

2. Description of the Prior Art

The LCD panel has been adopted as a display device of various electronic products, such as televisions and computer monitors, due to its small size, light weight, and low power consumption.

An LCD panel includes an array substrate, a CF (color filter) substrate facing the array substrate and keeping a cell gap from the array substrate, and liquid crystal molecules filled between the array substrate and the CF substrate. Basing on the direction of an electric field applied to the substrate, LCD panels are divided into a longitudinal electric filed type LCD panel, such as TN (twisted nematic) mode and STN (super twisted nematic) mode, and a latitudinal electric field type LCD panel, such as IPS (in-plane switching) mode that allows wide viewing angles. In either type of LCD panel, the liquid crystal molecules are electrically controlled by the array substrate, and the light transmittance of a backlight is filtered by the CF substrate so as to display colorful images.

In the past, spacers, mostly spherical spacers composed of plastics, have been spread out between the array substrate and the CF substrate for keeping the cell gap. In that case, the diameter of the spherical spacers are a crucial factor to the yield, and distributional accuracy of the spherical spacers is also required. However, it is difficult to precisely control the distributional density of the spherical spacers, and those unevenly distributed spherical spacers diffract or block the backlight. Consequently, the display quality of the LCD panel is reduced.

Figure 11:
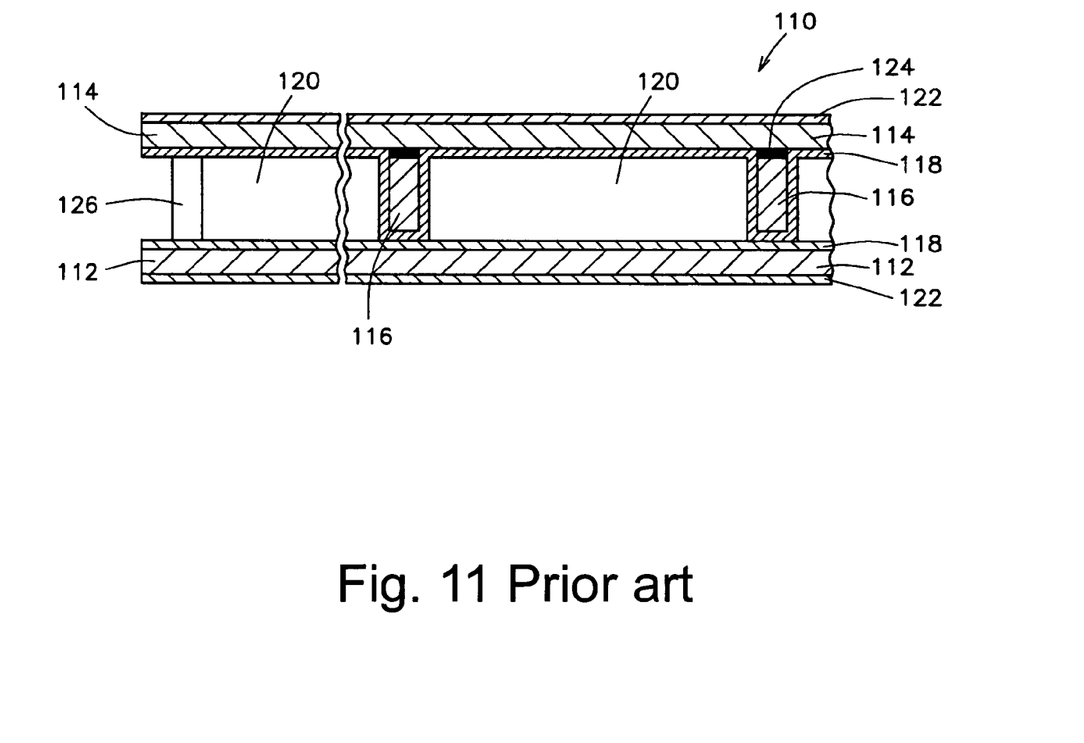
FIG. 11 is a schematic diagram of a conventional LCD panel.

Please refer to FIG. 11. FIG. 11 is a schematic diagram of a conventional LCD panel 110. As shown in FIG. 11, column spacers 116, which have been adopted recently, are used to replace the spherical spacers. The LCD panel 110 includes an array substrate 112, a CF substrate 114 facing the array substrate 112 and offset by a cell gap from the array substrate 112, and a plurality of column spacers 116 positioned between the array substrate 112 and the CF substrate 114 for keeping the cell gap.

Liquid crystal molecules 120 are implanted into a display region between the array substrate 112 and the CF substrate 114. The array substrate 112 and the CF substrate 114 are compressed with a sealing load to adjust the cell gap, and a sealing gel 126 is applied to the edges of the array substrate 112 and the CF substrate 114. In addition, the CF substrate 114 further includes a black matrix 124 for shielding the boundary region between pixels. Two alignment films 118 are respectively positioned on the surface of the array substrate 112, and the surface of the CF substrate 114 and the column spacers 116. Furthermore, two polarizers 122 are respectively positioned on the surface of the array substrate 112 and the surface of the CF substrate 114 that are not in contact with the liquid crystal molecules 120.

In addition to the method of adjusting the cell gap by applying a sealing load on the array substrate 112 and the CF substrate 114 (referred to as an LC implantation method) as previously mentioned, another method for implanting the liquid crystal molecules 120 (referred to as one drop fill method, ODF method) has been recently developed. According to the ODF method, the column spacers 116 are not applied with a sealing load for adjusting the cell gap between the array substrate 112 and the CF substrate 114. Instead, the cell gap between the array substrate 112 and the CF substrate 114 is adjusted by virtue of controlling the amounts of the liquid crystal molecules 120. It is worthy of note that the LC implantation method can be applied to an LCD panel with spherical spacers or column spacers 116, but the ODF method can only be adopted when the LCD panel is equipped with column spacers 116.

The column spacers 116 are formed, for instance, by forming an epoxy resin layer or a propylene resin layer with an even thickness on the array substrate 112 or the CF substrate 114, and performing a photolithography process to pattern the epoxy resin layer or the propylene resin layer. Therefore, the position of the column spacers 116 is precisely controlled. For example, if a display region is the region that actually displays images, and an aperture region is the region that allows the backlight through, the column spacers 116 are preferably formed in a non-aperture region that overlaps with the black matrix 124. This is because if the column spacers 116 are formed in the aperture region, the aperture ratio of the display region is reduced. In addition, the orientation of the liquid crystal molecules 120 close to the column spacers 116 is disordered, which leads to an uneven brightness problem.

In another aspect, a fixed and even cell gap is critical for improving and enhancing the display quality of the LCD panel 110. An uneven cell gap results in display defects, such as a color defect or a contrast defect. Therefore, for ensuring high display qualities, e.g. high-evenness of display, high contrast ratio, and high response time, a fixed and even cell gap is strictly required.

However, the thermal expansion of the liquid crystal molecules 120 and the column spacers 116 due to heat accumulated in the LCD panel 110, the inner pressure distribution of the liquid crystal molecules 120 in the LCD panel 110 due to gravity, or other factors makes it difficult to maintain a fixed cell gap.

Figure 5:
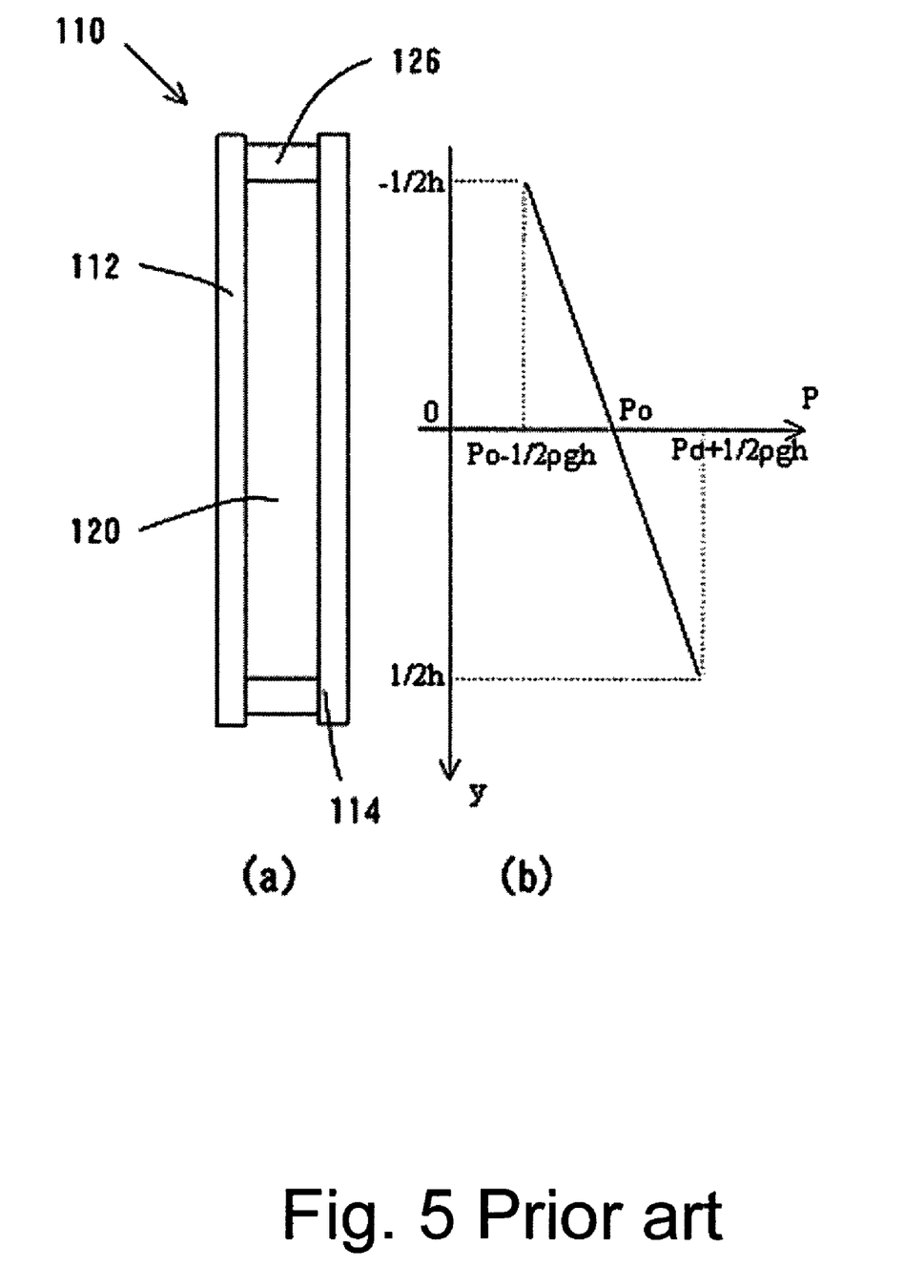
FIG. 5(a) is a schematic diagram illustrating an LCD panel in a vertical position.
FIG. 5(b) is a schematic diagram illustrating an inner pressure distribution due to gravity that acts upon the LCD panel shown in FIG. 5(a).

Please refer to FIG. 5(a) and FIG. 5(b). FIG. 5(a) is a schematic diagram illustrating an LCD panel 110 in a vertical position. FIG. 5(b) is a schematic diagram illustrating an inner pressure distribution due to gravity that acts upon the LCD panel 110 shown in FIG. 5(a). The LCD panel 110 includes spherical spacers (not shown), and is sealed with a sealing load. The inner pressure distribution P(y) of the liquid crystal molecules 120 in the LCD panel 110 can be expressed by Equation 1:

$$P(y)=P_0+\rho \cdot g \cdot y \ (-h/2 \leq y \leq h/2)$$

wherein $P_0$ denotes an average inner pressure of the liquid crystal molecules when sealed;

$\rho$ denotes the specific gravity of the liquid crystal molecules 120;

h denotes the height of the LCD panel 110 in the display region; and g denotes the acceleration of gravity.

Figure 6:
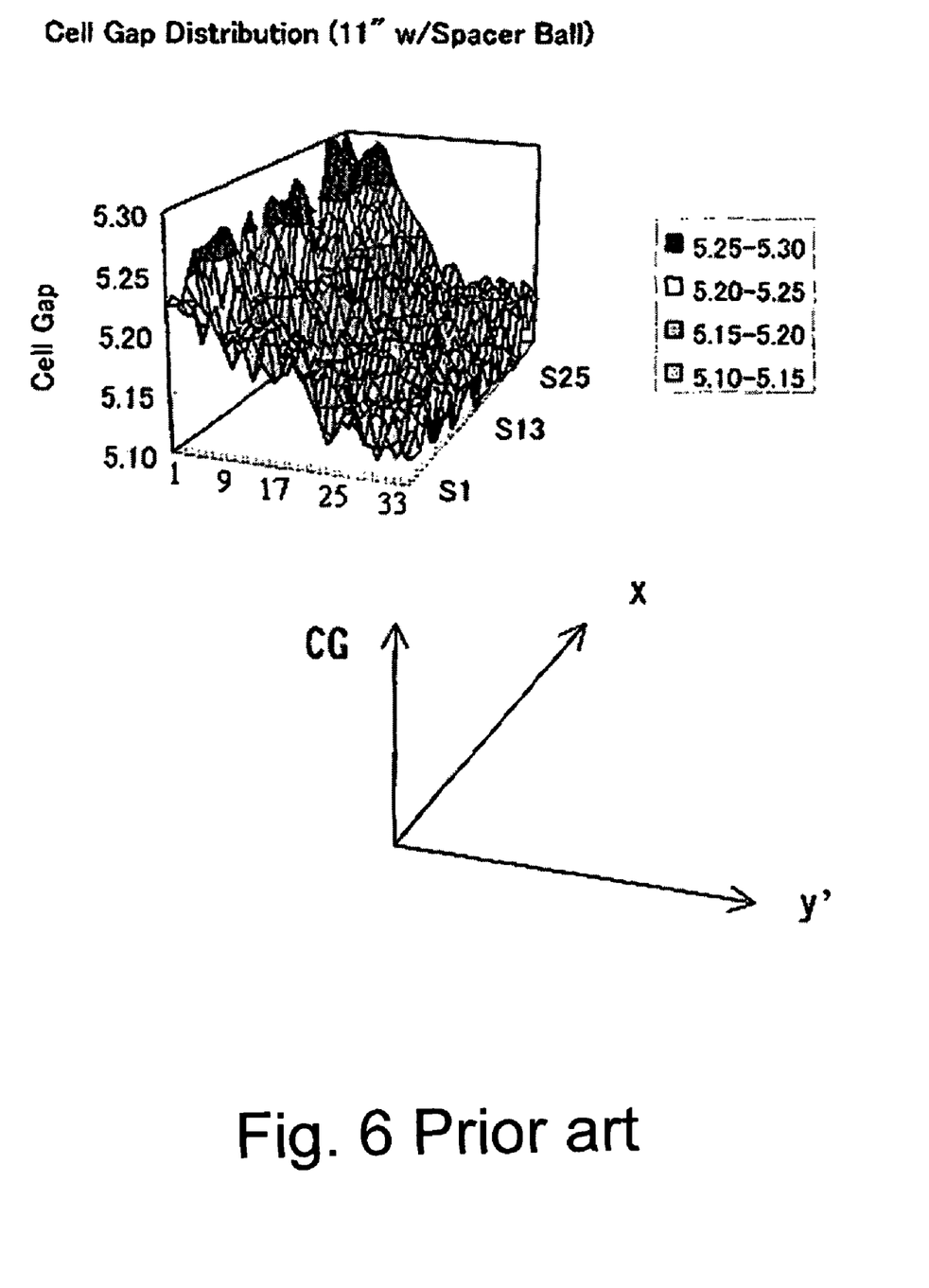
FIG. 6 is a schematic diagram illustrating a cell gap of the LCD panel shown in FIG. 5(a).

FIG. 6 is a schematic diagram illustrating a cell gap of the LCD panel shown in FIG. 5(a). In FIG. 6, the y' axis represents the height (mm) measured from the bottom of the LCD panel 110, the x axis represents the distance (mm) measured from the left end of the LCD panel 110, the CG axis represents the cell gap (μm) of the LCD panel 110, and y' and y have a relation of y'=-y+h/2. As shown in FIG. 6, the cell gap becomes larger in the lower portion of the LCD panel 110 in which the inner pressure of the liquid crystal molecules 120 is higher, and the cell gap becomes smaller in the upper portion of the LCD panel 110 in which the inner pressure of the liquid crystal molecules 120 is lower.

Recently, large-sized TVs are in demand, and therefore the demand for large-sized LCD panels increases. Normally, an LCD panel, especially a large-sized LCD panel for use in a TV, is in a vertical position when viewed, thus the inner pressure distribution of the liquid crystal molecules due to gravity is uneven. This uneven inner pressure distribution of the liquid crystal molecules leads to a cell gap difference between the upper portion and the lower portion of the LCD panel. In addition, the operation temperature in the LCD panel is generally about 50 to 70 degrees Celsius due to the heat generated by the backlight. In that case, the cell gap difference is significant, resulting in display defects known as gravity mura.

Specifically, gravity mura occurs when the LCD panel is in a vertical position at a high temperature. If the thermal expansion of the liquid crystal molecules exceeds the elastic deformation range when the LCD panel is sealed, the liquid crystal molecules in the cells accumulate in the bottom of the LCD panel due to gravity. This leads to an uneven cell gap.

Figure 9:
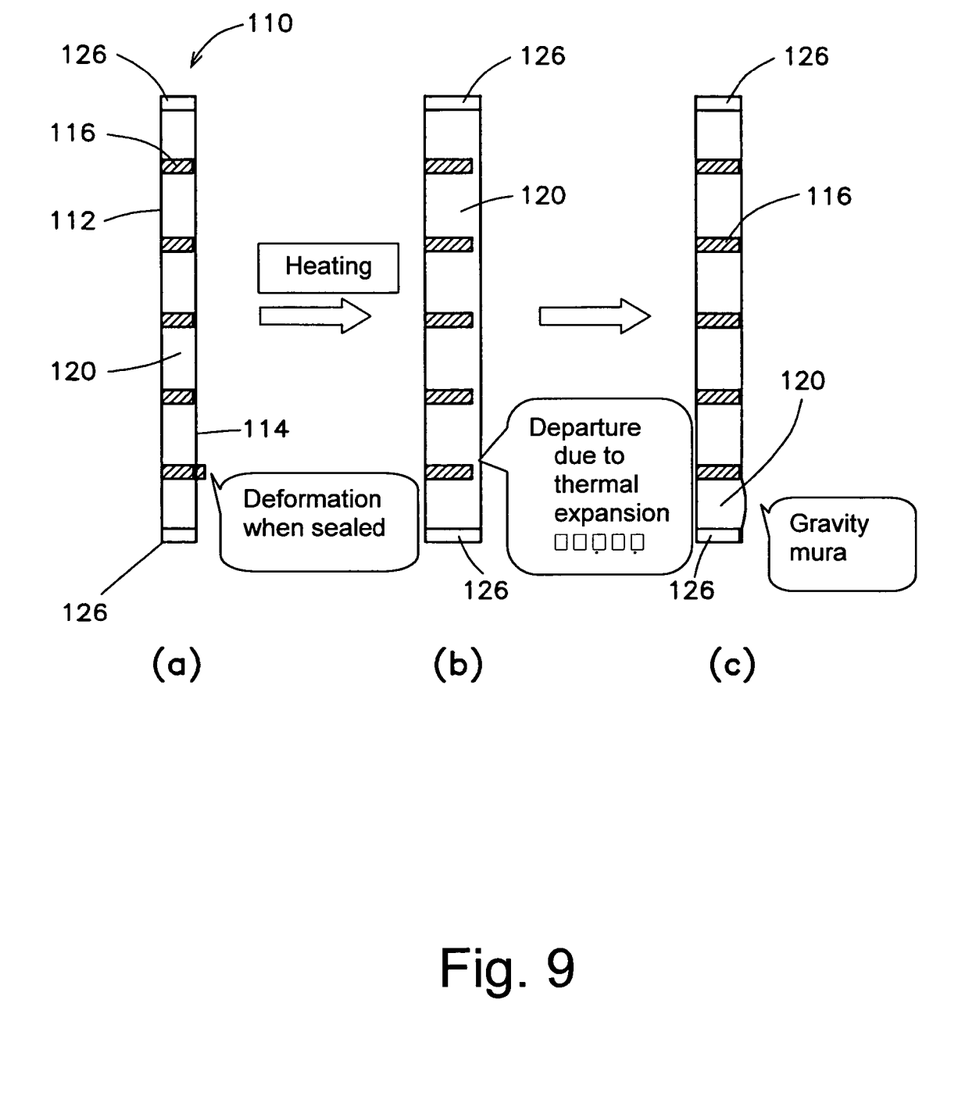
FIG. 9(a) through FIG. 9(c) are schematic diagrams illustrating how gravity mura occurs.

Please refer to FIG. 9(a) through FIG. 9(c). FIG. 9(a) through FIG. 9(c) are schematic diagrams illustrating how gravity mura occurs. As shown in FIG. 9(a), a sealing load is applied to the array substrate 112 and the CF substrate 114 (i.e. the column spacers 116) at atmospheric temperature, and the column spacers 116 have elastic deformations due to the applied sealing load. When the LCD panel 110 is heated, the liquid crystal molecules 120 expand. This increases the cell gap, and therefore decreases the elastic deformations of the column spacers 116. If the expansion of the column spacers 116 is not as large as the expansion of the cell gap, the column spacers 116 separate from the array substrate 112 or the CF substrate 114 as shown in FIG. 9(b). If the LCD panel 110 is in a vertical position, the liquid crystal molecules 120 flow downwards and accumulate in the bottom of the LCD panel 110 due to gravity. Consequently, gravity mura occurs in the lower portion of the LCD panel 110 as shown in FIG. 9(c).

Figure 7:
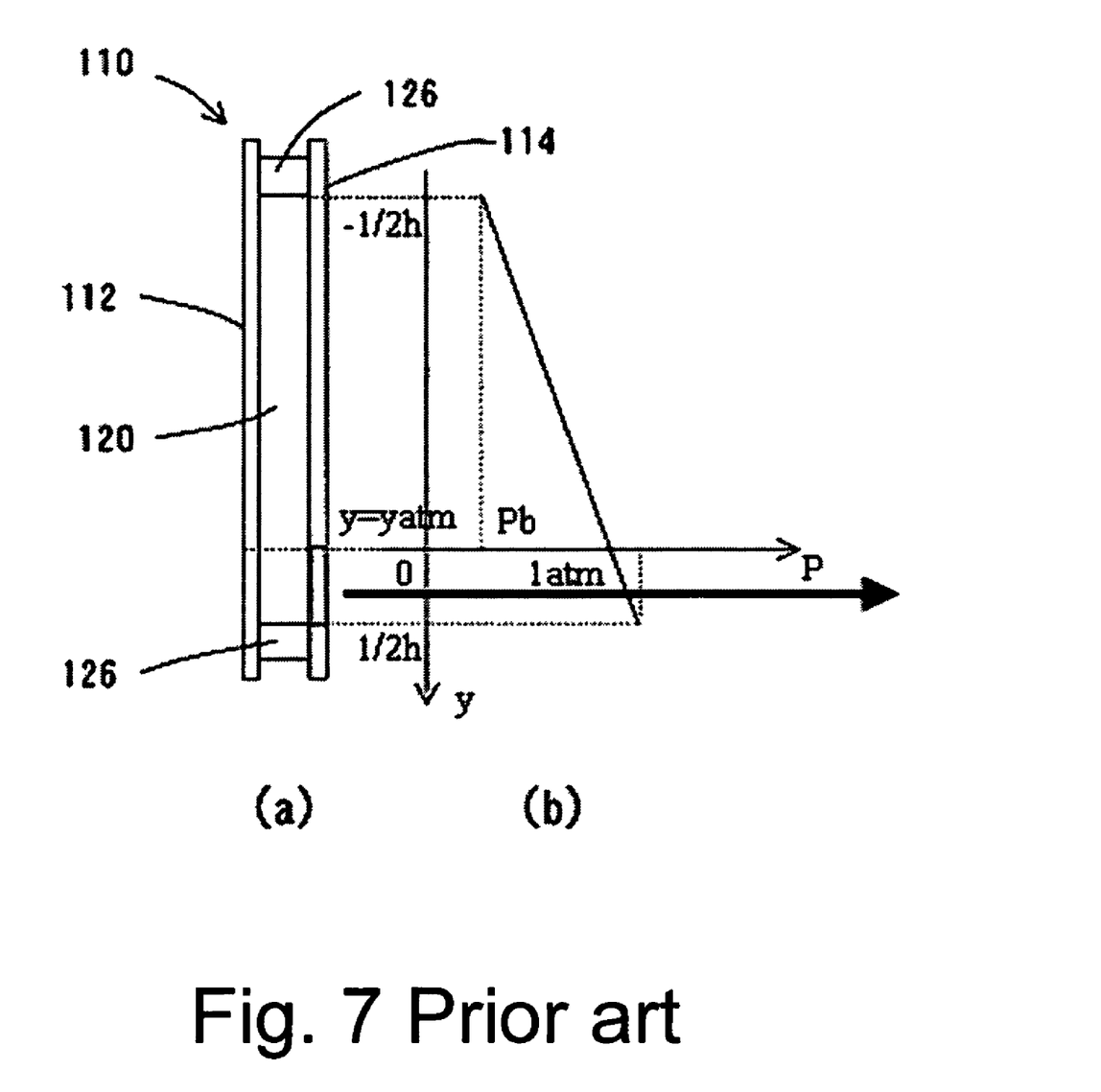
FIG. 7(a) is a cross-sectional view of a large-sized LCD panel in a vertical position.
FIG. 7(b) is a schematic diagram illustrating an inner pressure distribution due to gravity that acts upon the LCD panel shown in FIG. 7(a).

Please refer to FIG. 7(a) and FIG. 7(b). FIG. 7(a) is a cross-sectional view of a large-sized LCD panel in a vertical position. FIG. 7(b) is a schematic diagram illustrating an inner pressure distribution due to gravity that acts upon the LCD panel shown in FIG. 7(a). Differing from the LCD panel shown in FIG. 5(a), the LCD panel 110 shown in FIG. 7(a) is large-sized, and therefore the relation between the height y and the atmospheric pressure can be expressed as follows:

$$y=y_{atm}(-h/2 \leq y_{atm} \leq h/2)$$

Figure 8:
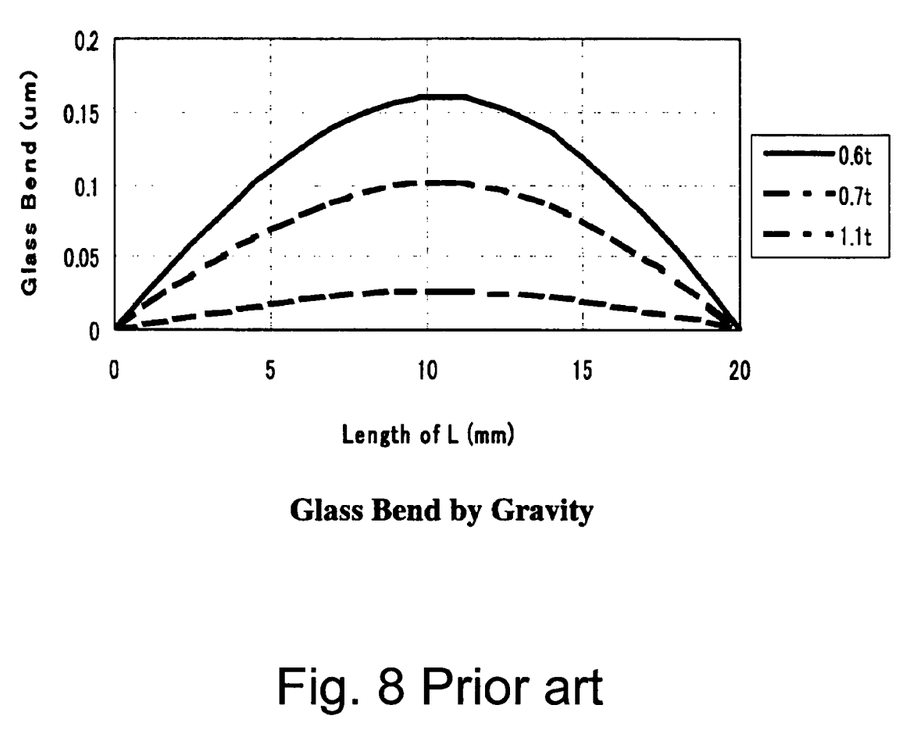
FIG. 8 is a schematic diagram illustrating a cell gap variation when an inner pressure of the LCD panel shown in FIG. 7(a) exceeds the atmospheric pressure.

In the large-sized LCD panel 110, if the liquid crystal molecules accumulate in the lower portion of the LCD panel 110, the inner pressure of the liquid crystal molecules 120 far exceeds the atmospheric pressure when $y_{atm} \leq y \leq h/2$. Consequently, the cell gap distribution is as FIG. 8 shows. In FIG. 8, the origin (L=0 mm) and the right end (L=20 mm) of the latitudinal axis respectively represent $y=y_{atm}$ and $y=2/h$ in FIG. 7(a), wherein y=h/2 is the position of the sealing gel 126. In addition, the longitudinal axis in FIG. 8 represents the cell gap variation compared to the original length of the column spacers 116, in which 0.6 t, 0.7 t, and 1.1 t respectively represent conditions in which the CF substrate 114 has a thickness of 0.6 mm, 0.7 mm, and 1.1 mm. It can be seen from FIG. 8 that the thinner the thickness of the CF substrate 114 is, the larger the cell gap variation becomes.

Japanese Patent No. 2002-37325 discloses a method for reducing the cell gap difference when the LCD panel is in a vertical position, so as to reduce display defects. The LCD panel of Japanese Patent No.2002-37325 includes a pair of substrates facing each other, a plurality of column spacers for keeping the cell gap formed on at least one of the substrates, and liquid crystal molecules filled between the substrates. The LCD panel is characterized by keeping the column spacers in the elastically deformed condition at a temperature from 25 to 50 degrees Celsius when the LCD panel is in a vertical position.

However, Japanese Patent No. 2002-37325 only considers the thermal expansion factor that affects the cell gap of the LCD panel, and fails to consider the gravity factor that also affects the cell gap.

SUMMARY

It is therefore a primary object of one embodiment of the claimed invention to compensate cell gap variation, especially in a large-sized LCD panel, due to inner pressure distribution, so as to improve display quality. Particularly, one embodiment, among others, of the present invention is proposed to prevent gravity mura at a high operating temperature.

The LCD panel of one embodiment of the present invention includes an array substrate, a CF substrate facing the array substrate and offset by a cell gap from the array substrate, a plurality of column spacers positioned on the array substrate or the CF substrate for maintaining the cell gap and supporting the array substrate and the CF substrate, and liquid crystal molecules sealed between the array substrate and the CF substrate. The column spacers have different coefficients of elasticity per unit area.

According to the liquid crystal display panel of one embodiment of the present invention, an inner pressure due to gravity of the liquid crystal molecules is less than atmospheric pressure when the liquid crystal display panel is in a vertical position for displaying.

According to one embodiment of the present invention, the coefficient of elasticity per unit area of the column spacers positioned in an upper portion of the liquid crystal display panel is greater than the coefficient of elasticity per unit area of the column spacers positioned in a lower portion of the liquid crystal display panel when the liquid crystal display panel is in a vertical position for displaying.

According to one embodiment of the present invention, when the liquid crystal display panel is in a vertical position for displaying, the coefficient of elasticity of the column spacers per unit area and a pressure distribution of the liquid crystal molecules have a relation as shown in Equation 4:

$$k(y)=(P_{atm}-(P_0+\rho \cdot g \cdot y))/\Delta d_0, (-h/2 \leq y \leq h/2);$$

wherein k(y) denotes the coefficient of elasticity of the column spacers per unit area (N/m³);

$P_{atm}$ denotes the atmospheric pressure (N/m²);

$P_0$ denotes an average inner pressure of the liquid crystal molecules when sealed (N/m²);

$\Delta d_0$ denotes a variation of the cell gap when the liquid crystal display panel is erected from a horizontal position parallel to a vertical position (m);

ρ denotes the specific gravity of the liquid crystal molecules (Kg/m³);

h denotes the height of a display region of the liquid crystal display panel (m); and g denotes the acceleration of gravity (m/s²).

Another liquid crystal display panel of one embodiment of the present invention includes an array substrate, a CF substrate facing the array substrate and offset by a cell gap from the array substrate, a sealing gel for maintaining the cell gap and bonding edges of the array substrate and the CF substrate, a plurality of column spacers positioned between the array substrate and the CF substrate for maintaining the cell gap and supporting the array substrate and the CF substrate, liquid crystal molecules surrounded by the seal gel and sealed between the array substrate and the CF substrate, and at least one rib connecting to two points of the sealing gel and maintaining the cell gap between the array substrate and the CF substrate, therewith the liquid crystal display panel is divided into a plurality of cells.

According to one embodiment of the present invention, the rib divides the liquid crystal display panel into the plurality of cells when the liquid crystal display panel is in a vertical position for displaying.

According to one embodiment of the present invention, an inner pressure due to gravity of the liquid crystal molecules is less than the atmospheric pressure when the liquid crystal display panel is in a vertical position for displaying.

According to one embodiment of the present invention, the coefficient of elasticity per unit area of the column spacers positioned in an upper portion of the liquid crystal display panel is greater than the coefficient of elasticity per unit area of the column spacers positioned in a lower portion of the liquid crystal display panel when the liquid crystal display panel is in a vertical position for displaying.

According to one embodiment of the present invention, when the liquid crystal display panel is in a vertical position for displaying, the coefficient of elasticity of the column spacers per unit area and a pressure distribution of the liquid crystal molecules have a relation shown in Equation 4:

$$k(y)=(P_{atm}-(P_0+\rho \cdot g \cdot y))/\Delta d_0, (-h/2 \leq y \leq h/2);$$

wherein $k(y)$ denotes the coefficient of elasticity of the column spacers per unit area (N/m³);

$P_{atm}$ denotes the atmospheric pressure (N/m²);

$P_0$ denotes an average inner pressure of the liquid crystal molecules when sealed (N/m²);

$\Delta d_0$ denotes a variation of the cell gap when the liquid crystal display panel is erected from a horizontal position parallel to a vertical position (m);

$\rho$ denotes the specific gravity of the liquid crystal molecules (kg/m³);

h denotes the height of a display region of the liquid crystal display panel (m); and g denotes the acceleration of gravity (m/s²).

According to one embodiment of the present invention, a length of an upper portion of the liquid crystal display panel in the direction of gravity is shorter than a length of a lower portion of the liquid crystal display panel in the direction of gravity when the liquid crystal display panel is in a vertical position for displaying.

According to one embodiment of the present invention, the rib and the column spacers are part of the same monolithically-formed structure.

One embodiment, among others, of the present invention takes the stiffness and distribution of the column spacers into consideration, so as to obtain an even cell gap. In addition, the LCD panel of one embodiment of the present invention has a longitudinally-separated cell structure, and thus obtains a narrower inner pressure distribution compare to that of a conventional large-sized LCD panel. Consequently, the uneven cell gap problem in the large-sized LCD panel because of gravity mura is reduced.

These and other objectives of various embodiments of the present invention will no doubt become apparent to those of ordinary skill in the art after reading the following detailed description of the preferred embodiment that is illustrated in the various figures and drawings.

DETAILED DESCRIPTION

The conditions of the inner pressure distribution in the LCD panel are classified into condition 1 and condition 2. In the following descriptions, y denotes the longitudinal axis, which indicates the direction of gravity when the LCD panel is in a vertical position and satisfies the relation of $-h/2 \leq y \leq h/2$. In other words, the upper end of the display region of the LCD panel is $y=-h/2$, and the lower end of the display region of the LCD panel is $y=h/2$. The inner pressure in the LCD panel due to gravity is denoted by P, the atmospheric pressure is $P_{atm}$, and $y=y_{atm}$ when $P=P_{atm}$.

Condition 1:

The relation of $y=y_{atm}$ ($-h/2 \leq y \leq h/2$) when $P=P_{atm}$ does not exist in the LCD panel. Namely, the inner pressure P is always less than the atmospheric pressure $P_{atm}$.

Condition 2:

The relation of $y=y_{atm}$ ($-h/2 \leq y \leq h/2$) when $P=P_{atm}$ exists in the LCD panel.

In condition 1, the distribution of the column spacers according to the LCD panel of one embodiment of the present invention corresponds to the inner pressure distribution of the liquid crystal molecules. In condition 2, the LCD panel of one embodiment of the present invention is longitudinally divided into several small panels by installing at least one rib.

The following configurations are directed to condition 1 and condition 2.

(1) The first configuration is directed to condition 1 in which the relation of y=$y_{atm}$ ($-h/2 \leq y \leq h/2$) when P=$P_{atm}$ does not exist.

Figure 3:
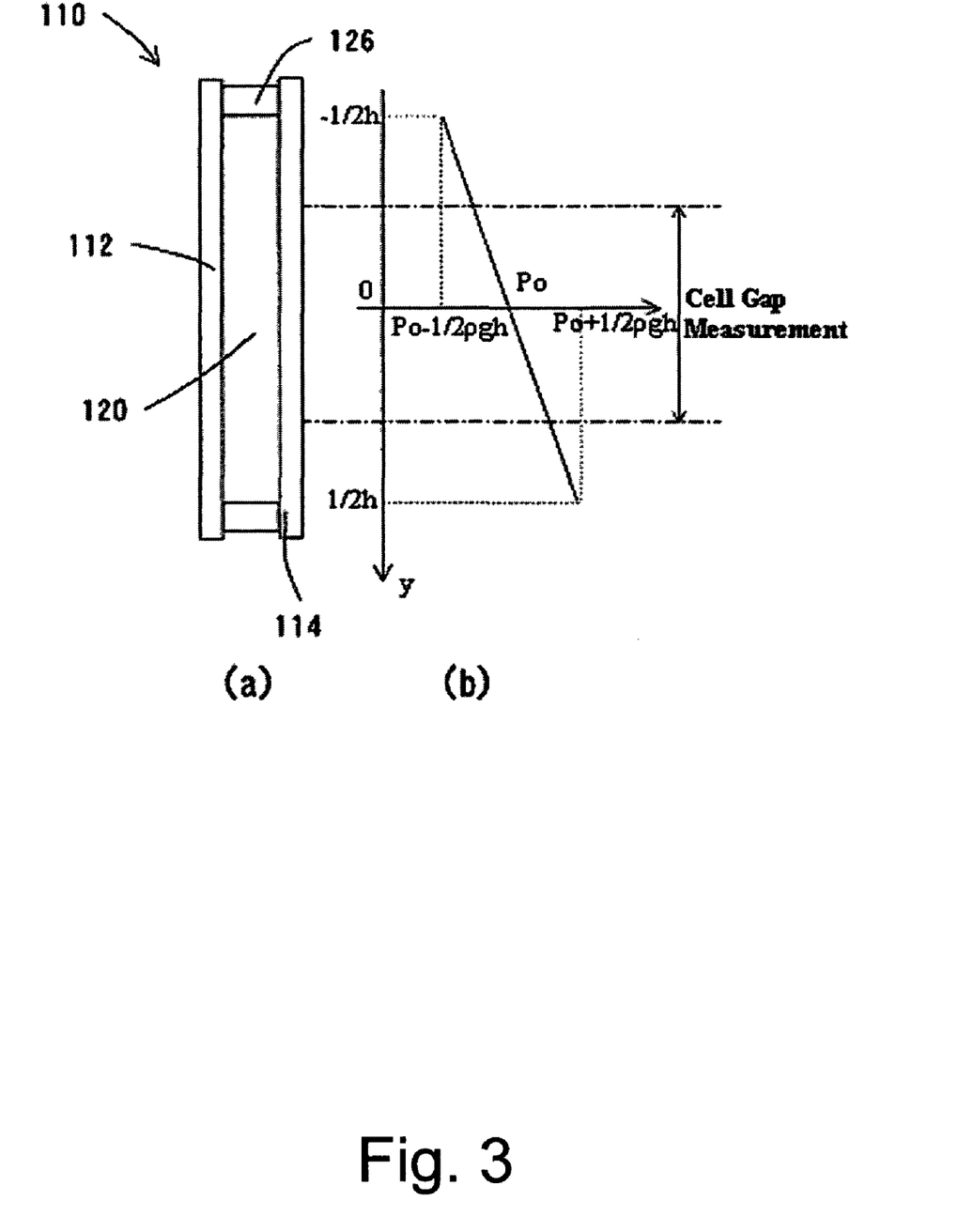
FIG. 3(a) is a cross-sectional view of an LCD panel according to a first configuration of one embodiment the present invention.
FIG. 3(b) is a schematic diagram illustrating an inner pressure distribution due to gravity that acts upon the LCD panel shown in FIG. 3(a).

Please refer to FIG. 3(a) and FIG. 3(b). FIG. 3(a) is a cross-sectional view of an LCD panel 110 having liquid crystal molecules sealed therein. FIG. 3(b) is a schematic diagram illustrating an inner pressure distribution due to gravity that acts upon the LCD panel 110 shown in FIG. 3(a). The LCD panel 110 has a 170 mm*230 mm display region. As shown in FIG. 3(a), the LCD panel 110 is in a vertical position, and the inner pressure distribution of the liquid crystal molecules 120 due to gravity is shown in FIG. 3(b). The inner pressure distribution P(y) can be expressed by Equation 1 as previously mentioned.

Figure 4:
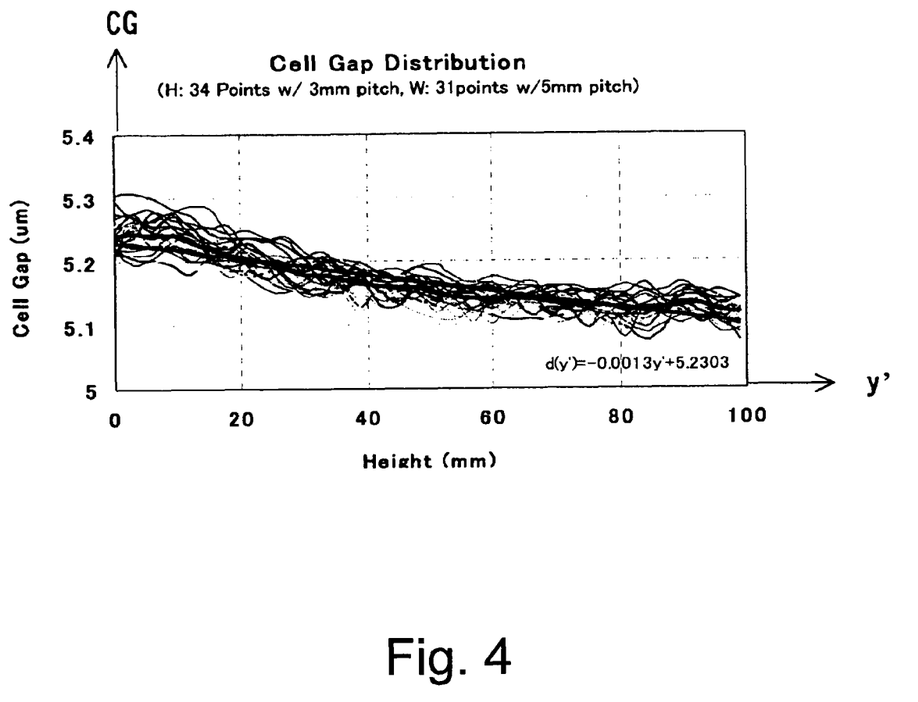
FIG. 4 is a schematic diagram illustrating a cell gap of the LCD panel shown in FIG. 3(a).

Please refer to FIG. 4. FIG. 4 is a schematic diagram illustrating a cell gap of the LCD panel shown in FIG. 3(a). In FIG. 4, the y' axis represents the height measured every 3 mm from the bottom of the LCD panel 110. Thus, the CG axis represents the cell gap of the LCD panel 110. The plurality of data (curves in FIG. 4) are measured at different horizontal points (widths) of the LCD panel 110, the relation of CG (y')= = −0.0013y'+5.2303 can be obtained. In this configuration, the cell gap is measured when −50 mm≦y≦50 mm. In addition, the y' axis is measured on the basis of y=−50 mm, and thus the relation of y'=−y+50 exists. Therefore, CG(y) can be expressed by Equation 2:

$$CG(y) = -0.0013(-y+50) + 5.2303$$
$$= 0.0013y + 5.1653,$$
$$(-50 \text{ mm} \leq y \leq 50 \text{ mm}).$$

Therefore, a cell gap difference of 0.13 μm exists between the top end (y=−50 mm) and the bottom end (y=50 mm).

On the other hand, the deformation Δd(y) of the column spacers 116 when the LCD panel 110 is erected from a horizontal position to a vertical position can be expressed by Equation 3:

$$\Delta d(y) = (P_{atm} - P(y))/k$$
$$= (P_{atm} - (P_0 + \cdot g \cdot y))/k,$$
$$(-h/2 \leq y \leq h/2);$$

wherein
  $P_{atm}$ represents the atmospheric pressure (N/m²);
  $P_0$ denotes the average inner pressure of the liquid crystal molecules when sealed (N/m²);
  ρ denotes the specific gravity of the liquid crystal molecules (kg/m³);
  h denotes the height of the display region of the LCD panel (m);
  g denotes the acceleration of gravity (m/s²); and
  k(y) denotes the coefficient of elasticity per unit area of the column spacers (N/m³).

It can be seen that Δd(y)≧0 is satisfied on condition 1. Namely, since the inner pressure P(y) is always less than the atmospheric pressure $P_{atm}$, the column spacers 116 never reach their original length, i.e. the column spacers 116 are always elastically deformed. However, as y becomes larger, i.e. in the lower portion of the LCD panel 110, Δd(y) becomes smaller. In other words, as the length of the column spacers 116 becomes larger, the cell gap becomes larger in the lower portion of the LCD panel 110.

In order to equalize the cell gap, the deformation Δd(y) of the column spacers 116 must be a predetermined constant. Accordingly, the distribution of the coefficient of elasticity k(y) has to satisfy Equation 4:

$$k(y)=(P_{atm}-(P_0+\rho \cdot g \cdot y))/\Delta d_0, (-h/2 \leq y \leq h/2);$$

wherein
  k(y) denotes the coefficient of elasticity per unit area of the column spacers (N/m³);
  $P_{atm}$ denotes the atmospheric pressure (N/m²);
  $P_0$ denotes the average inner pressure of the liquid crystal molecules when sealed (N/m²);
  $\Delta d_0$ denotes the deformation of the cell gap when the LCD panel is erected from a horizontal position to a vertical position (m);
  ρ denotes the specific gravity of the liquid crystal molecules (kg/m³);
  h denotes the height of the display region of the LCD panel (m); and
  g denotes the acceleration of gravity (m/s²).

If the coefficient of elasticity of a column spacer 116 is set as kps(y), and a(y) represents the number of column spacers 116 per unit area in the LCD panel 110, the distribution of the coefficient of elasticity k(y) can be expressed by Equation 5:

$$K(y)=kps(y) \cdot a(y)$$

wherein
  k(y) represents the coefficient of elasticity per unit area of the column spacers (N/m³);
  kps(y) represents the coefficient of elasticity of a column spacer; and
  a(y) represents the number of column spacers per unit area in the LCD panel.

Therefore, if kps(y) or a(y), or both kps(y) and a(y) are manipulated so that k(y) satisfies Equation 4, the cell gap of the LCD panel is even.

(2) The second configuration is directed to condition 2, in which the relation of y=$y_{atm}$ ($-h/2 \leq y \leq h/2$) when P=$P_{atm}$ exists.

FIG. 7(a) is a cross-sectional view of an LCD panel 110 in a vertical position, in which the column spacers are applied with a sealing load. Since the LCD panel 110 is very large, the relation of y=$y_{atm}$ ($-h/2 \leq y \leq h/2$) when P=$P_{atm}$ is satisfied.

Please refer to FIG. 8. FIG. 8 is a schematic diagram illustrating a cell gap variation when an inner pressure of the LCD panel shown in FIG. 7(a) exceeds the atmospheric pressure. In the LCD panel 110, if the liquid crystal molecules 120 accumulate in the bottom of the LCD panel 110, the inner pressure of the liquid crystal molecules 120 is far larger than the outer pressure (atmospheric pressure) when $y_{atm} \leq y \leq h/2$. Consequently, a cell gap distribution is obtained as shown in FIG. 8. In FIG. 8, the origin (L=0 mm) and the right end (L=20 mm) of the latitudinal axis correspond to the point y=($y_{atm}$) and the point (y=−h/2) of the sealing gel 126 of FIG. 7(b). The longitudinal axis of FIG. 8 shows the variation of the cell gap (i.e. the substrate bend) when $-h/2 \leq y \leq y_{atm}$. In addition, 0.6 t, 0.7 t, and 1.1 t respectively represent conditions in which the CF substrate 114 has a thickness of 0.6 mm, 0.7 mm, and 1.1 mm.

Similar to the first configuration, the coefficient of elasticity k(y) per unit area of the column spacers 116 can be adjusted when $-h/2 \leq y \leq y_{atm}$ to equalize the cell gap. However, when $y_{atm} \leq y \leq h/2$, the column spacers 116 depart from the array substrate 112 or the CF substrate 114. That means in this condition Equation 3 is not sustained.

Figure 1:
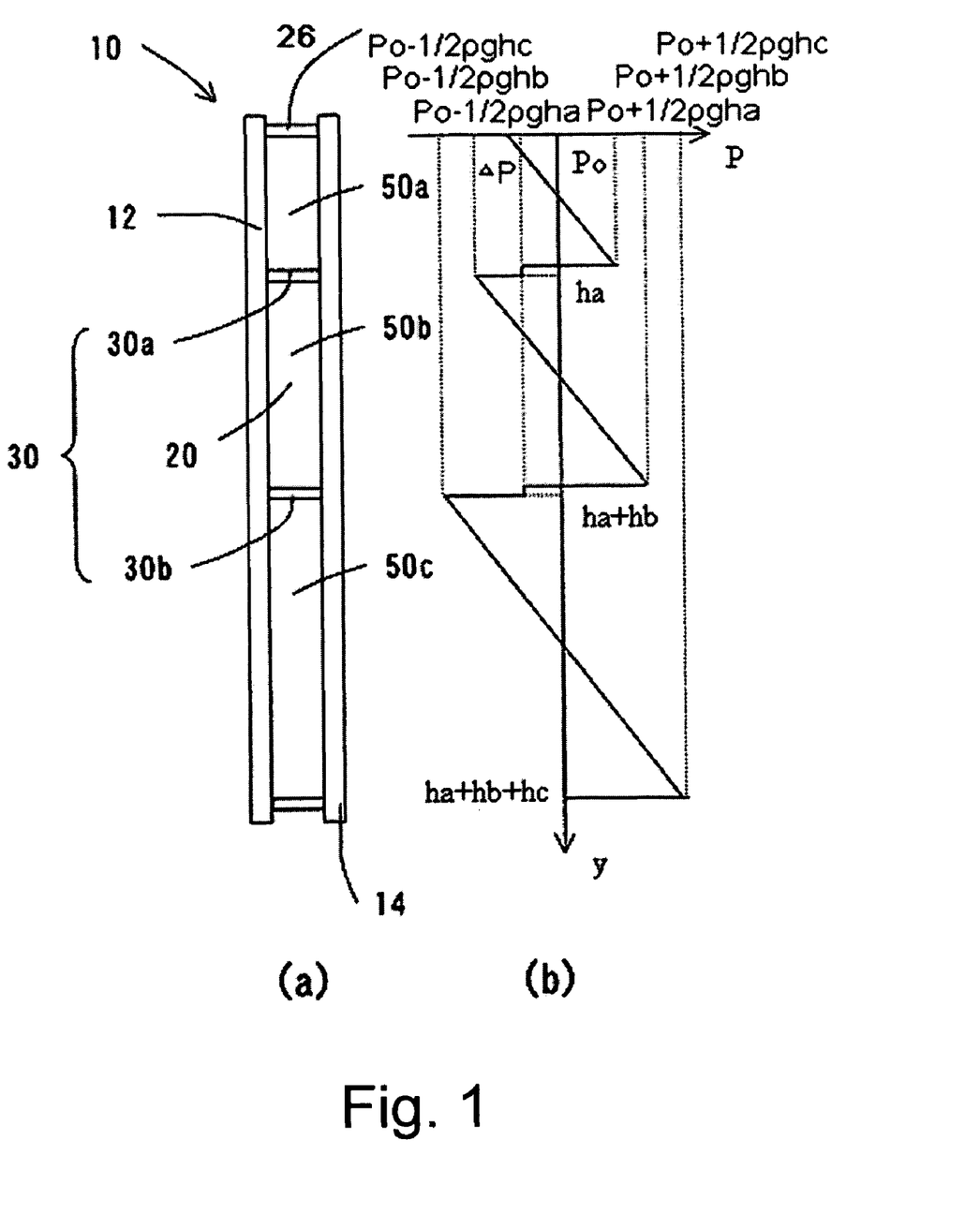
FIG. 1(a) is a cross-sectional view of an LCD panel according to a second configuration of one embodiment of the present invention.
FIG. 1(b) is a schematic diagram illustrating an inner pressure distribution due to gravity that acts upon the LCD panel shown in FIG. 1(a).
Figure 2:
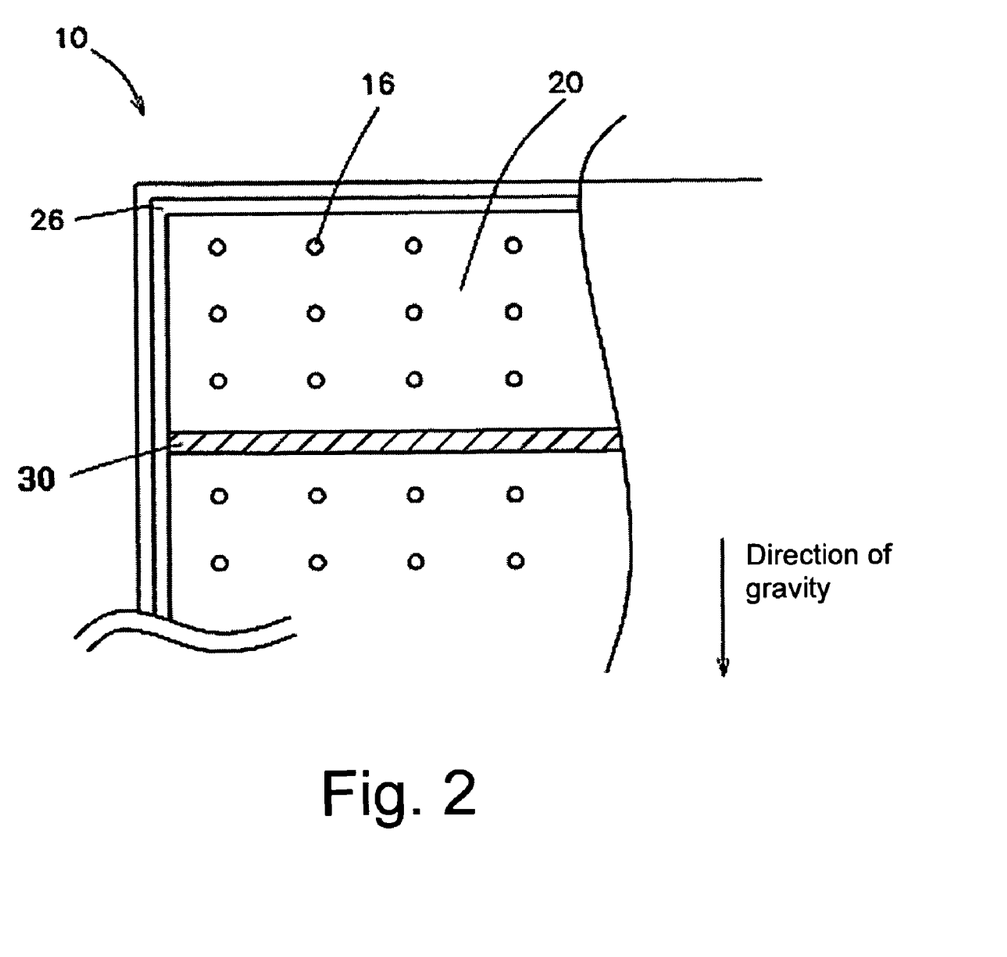
FIG. 2 is a top view of the LCD panel shown in FIG. 1(a).

Therefore, in the second configuration, as shown in FIG. 1(a) and FIG. 2, the inner pressure difference ΔP of the cell in both the upper portion and the lower portion of the LCD panel 110 are kept less than the atmospheric pressure by virtue of a plurality of ribs 30.

Please refer to FIG. 1(a), FIG. 1(b), and FIG. 2. FIG. 1(a) is a cross-sectional view of an LCD panel 10 according a second configuration of one embodiment of the present invention. FIG. 1(b) is a schematic diagram illustrating an inner pressure distribution due to gravity that acts upon the LCD panel 10 shown in FIG. 1(a). FIG. 2 a top view of the LCD panel 10 shown in FIG. 1(a). The LCD panel 10, similar to the LCD panel 110, includes an array substrate 12, a CF substrate 14 facing the array substrate 12 and keeping a cell gap from the array substrate 12, and a plurality of column spacers 16 positioned between the array substrate 12 and the CF substrate 14 for maintaining the cell gap. The LCD panel 10 further includes liquid crystal molecules 20 sealed in a display region by the LC implantation method or the ODF method with a sealing gel 26 coated in the edges of the array substrate 12 and the CF substrate 14. The LCD panel 10 further includes a black matrix (not shown) for shielding the boundary region between pixels. Two alignment films (not shown) are respectively positioned on the surface of the array substrate 12, and the surfaces of the CF substrate 14 and the column spacers 16. Furthermore, two polarizers (not shown) are respectively positioned on the surface of the array substrate 12 and the surface of the CF substrate 14 that are not in contact with the liquid crystal molecules 20.

As shown in FIG. 1(a) and FIG. 2, the LCD panel 10 further includes a plurality of ribs 30. The ribs 30a and 30b are installed in a latitudinal direction vertical to the direction of gravity (referred to as a longitudinal direction) at positions $h_a$ and $h_a+h_b$.

The LCD panel 10 is divided into three cells 50a, 50b, and 50c by the ribs 30a and 30b. The cell positioned in the lower portion is not affected by the gravity force of the liquid crystal molecules 20 in the cell positioned in the upper portion because of the ribs. For instance, the inner pressure in the cell 50b is not affected by the gravity force of the liquid crystal molecules 20 in the cell 50a since the rib 30a takes the pressure acting thereupon. Similarly, the inner pressure in the cell 50c is not affected by the gravity force of the liquid crystal molecules 20 in the cell 50b because the rib 30b takes the pressure acting thereupon.

Therefore, the inner pressure distribution of the cells 50a, 50b, and 50c, as shown in FIG. 1(b), is independent. The inner pressure distribution of each cell can be expressed by Equations 6:

$$P(y)=P_0-(\tfrac{1}{2})\rho g h_a+\rho g y\ (0\leq y\leq h_a);$$

$$P(y)=P_0-(\tfrac{1}{2})\rho g h_b+\rho g(y-h_a)\ (h_a\leq y\leq h_a+h_b);$$

$$P(y)=P_0(\tfrac{1}{2})\rho g h_c+\rho g(y-h_a-h_b)\ (h_a+h_b\leq y\leq h_a+h_b+h_c);$$

wherein
$P_0$ denotes the average inner pressure of the liquid crystal molecules when sealed;
$\rho$ denotes the specific gravity of the liquid crystal molecules;
$h_a$ denotes the longitudinal height of the cell 50a;
$h_b$ denotes the longitudinal height of the cell 50b;
$h_c$ denotes the longitudinal height of the cell 50c; and
g denotes the acceleration of gravity.

Since the inner pressure distribution width $\Delta P_a$, $\Delta P_b$, and $\Delta P_c$ of each cell 50a, 50b, and 50c is less than the atmospheric pressure, gravity mura does not occur.

Furthermore, the latitudinal length of the cell positioned in the upper portion of the LCD panel is shorter than that of the cell positioned in the lower portion of the LCD panel, i.e. $h_a\leq h_b\leq h_c$, and therefore $\Delta P_a\leq\Delta P_b\leq\Delta P_c$. This makes the pressure acting on the rib between the cells 50a and 50b, or between the cells 50b and 50c smaller than the average inner pressure, thereby preventing liquid crystal molecules from moving from the cell 50a to the cell 50b, or from the cell 50b to the cell 50c.

Therefore, the inner pressure distribution width of each cell is less than the atmospheric pressure, and an even cell gap is ensured.

Different embodiments are listed hereinafter for elaborating the LCD panel of the present disclosure.

Embodiment 1

As disclosed in the first configuration, if k(y) (the coefficient of elasticity per unit area of the column spacers 116) satisfies Equation 4, then k(y) can be further expressed by Equation 5:

$$K(y)=kps(y)\cdot a(y)$$

wherein
k(y) denotes the coefficient of elasticity per unit area of the column spacers (N/m$^3$);
kps(y) denotes the coefficient of elasticity of a column spacer; and
a(y) denotes the number of column spacers per unit area in the LCD panel.

In this embodiment, the coefficient of elasticity of each column spacer is set as a constant, i.e. kps(y)=kps, and a(y) (the number of column spacers per unit area in the LCD panel) varies with y. Consequently, a(y) can be expressed by Equation 7:

$$a(y)=(P_{atm}-(P_0+\rho g\cdot y))/(\Delta d_0\cdot kps)$$

wherein
$\Delta d_0$ denotes the deformation of the cell gap when the LCD panel is erected from a horizontal position to a vertical position (m).

In addition, when the area s of a column spacer 116 is a constant, and when the density of the column spacers 116 is b(y), a(y) can be expressed by Equation 8:

$$a(y)=s\cdot b(y)$$

wherein
b(y) denotes the density of the column spacers; and
s denotes the area of a column spacer.

Therefore, in this embodiment, b(y) satisfies Equation 9, and an LCD panel having an even cell gap deformation $\Delta d_0$ is obtained.

$$b(y)=(P_{atm}-(P_0+\rho\cdot g\cdot y))/(\Delta d_0\cdot s\cdot kps)\ (-h/2\leq y\leq h/2) \quad \text{Equation 9:}$$

Figure 10:
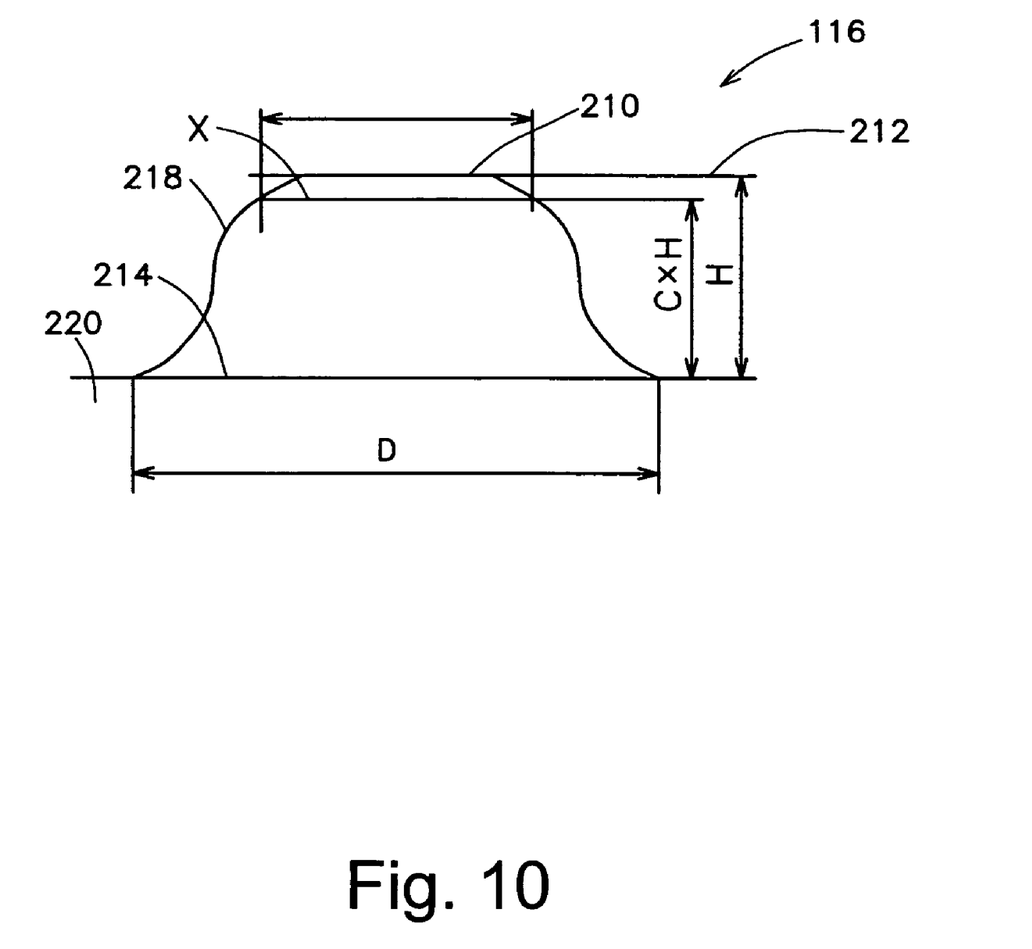
FIG. 10 is a cross-sectional view of a column spacer.

In this embodiment, the area s of the column spacer 116 is the top surface of the column spacer 116, but the profile of the column spacer 116 is not flat during the etching process as shown in FIG. 10. Therefore, the top surface of the column spacer 116 is preferably defined as by following these instructions. Please refer to FIG. 10 (also Japanese Patent No. 2000-321580). First, draw a tangent line 212 along the top surface 210 of the column 116, and set the length of the bottom surface 214 equal D. Subsequently, set the distance between the top surface 210 and the bottom surface 214 of the column spacer 116 equal H, and multiply H by a constant C (e.g. 0.9). Then, draw a line X parallel to the substrate 220 and having a distance of (C×H) from the substrate 220. Finally, define the distance between the intersections of the line X and the profile 218 of the column spacer 116 as the dimension of the top surface 210. Consequently, the area s of the column spacer 116 can be defined in accordance with the dimension of the top surface 210.

Embodiment 2

In this embodiment, the density b of the column spacers 116 is a constant, and the number a(y) of column spacers per unit area in the LCD panel is a function corresponding to the area s(y) of the column spacer 116.

$$a(y)=s(y) \cdot b \quad \text{Equation 10:}$$

wherein
b denotes the density of the column spacers; and
s(y) denotes the area of a column spacer.

When the area s(y) of the column spacer 116 satisfies Equation 11, an LCD panel having an even cell gap $\Delta d_0$ is obtained.

$$s(y)=(P_{atm}-(P_{0\ +\rho \cdot g \cdot y}))/(\Delta d_0 \cdot b \cdot kps)\ (h/2 \leq y \leq h/2) \quad \text{Equation 11:}$$

Embodiment 3

This embodiment is directed to the second configuration. In the second configuration, the LCD panel 10 is divided into a cell 50a, a cell 50b, and a cell 50c by two ribs 30a and 30b. The width of the inner pressure distribution $\Delta h_a$, $\Delta h_b$, $\Delta h_c$ in each cell is less than the atmospheric pressure. In that case, if the number a(y) of the column spacers 16 satisfies Equation 6, an LCD panel having an even cell gap $\Delta d_0$ is obtained.

In this embodiment, and similar to Embodiment 1, the area s of the column spacers 16 is constant, the density b(y) of the spacers 16 is a function, and a(y)=s·b(y). Consequently, Equations 12 are obtained.

$$b(y)=(P_{atm}-(P_0+\rho \cdot g \cdot (y-h_a/2)))/(\Delta d_0 \cdot s \cdot kps)\ (0 \leq y \leq h_a)$$

$$b(y)=(P_{atm}-(P_0+\rho \cdot g \cdot (y-h_a-h_b/2)))/(\Delta d_0 \cdot s \cdot kps)\ (h_a \leq y \leq h_a+h_b)$$

$$b(y)=(P_{atm}-(P_0+\rho \cdot g \cdot (y-h_a-h_b-h_c/2)))/(\Delta d_0 \cdot s \cdot kps)\ (h_a+h_b \leq y \leq h_a+h_b+h_c) \quad \text{Equation 12:}$$

wherein
$P_0$ denotes the average inner pressure of the liquid crystal molecules when sealed;
$\rho$ denotes the specific gravity of the liquid crystal molecules;
$h_a$ denotes the longitudinal height of the cell 50a;
$h_b$ denotes the longitudinal height of the cell 50b;
$h_c$ denotes the longitudinal height of the cell 50c; and
g denotes the acceleration of gravity.

In this embodiment, the area s of the column spacer 16 is constant. However, if the density b of the column spacers 16 is constant as disclosed in Embodiment 2, an LCD panel having an even cell gap can also be obtained even though the number a(y) of the column spacers 16 varies with y. In other words, an LCD panel having an even cell gap can also be obtained by either setting the area s of the column spacer 16 a constant or setting the density b of the column spacers 16 a constant.

In the above embodiments, one embodiment of the present invention is illustrated when the LCD panel is in a vertical position. However, embodiments of the present invention are not limited, and can be applied when an included angle θ of the LCD panel and the ground is between 0°≦θ≦90°.

In the above embodiments, the coefficient of elasticity of a column spacer kps(y) is set as a constant, i.e. kps(y)=kps, so that the number a(y) of column spacers 16 per unit area corresponds to y. However, one embodiment of the present invention can also be implemented by setting the number a(y) of the column spacers 16 per unit area to a constant, i.e. a(y)=a. In that case, kps(y) varies with y. Or, both the coefficient of elasticity of a column spacer kps(y) and the number a(y) of column spacers 16 per unit area can be varied with y. The LCD panel of one embodiment of the present invention covers all LCD panels in which the coefficient of elasticity of the column spacers per unit area k(y) satisfies Equation 4.

Furthermore, the two ribs 30a and 30b are positioned in the LCD panel 10 for defining cells in Embodiment 2, but the quantity of ribs is not limited. Besides, column spacers are selected as an example in the embodiments, and spherical spacers can also be adopted. The material and shape of the column spacers are not limited. Additionally, the ratio of the side length or the diameter of the top surface to the side length or the diameter of the bottom surface is preferably between 50% to 100%.

The ribs and the column spacers can be either separate structures, or a monolithically-formed structure.

The LCD panel of one embodiment of the present invention can be either IPS mode, TN mode, STN mode, etc.

The operation temperature of the LCD panel of one embodiment of the present invention is within an ambient temperature range, which is, for instance, between 0 to 70 degrees Celsius.

Those skilled in the art will readily observe that numerous modifications and alterations of the device and method may be made while retaining the teachings of the present disclosure. Accordingly, the above disclosure should be construed as limited only by the metes and bounds of the appended claims.

What is claimed is:

1. A liquid crystal display panel having a length and a width, the liquid crystal display comprising:
   a first substrate;
   a second substrate facing the first substrate and offset by a cell gap from the first substrate;
   a sealing gel bonding an edge of the first substrate and an edge of the second substrate;
   a plurality of spacers disposed in a display region having a boundary defined by the sealing gel, wherein the plurality of spacers are positioned between the first substrate and the second substrate for maintaining a fixed cell gap along an entire length of the liquid crystal display panel and supporting the first substrate and the second substrate; and
   liquid crystal molecules sealed between the first substrate and the second substrate,
   wherein the spacers have different coefficients of elasticity per unit area such that the coefficients of elasticity per unit area of the spacers gradually decrease downwardly along the entire length of the liquid crystal display panel when the liquid crystal display panel is in a vertical position for displaying.

2. The liquid crystal display panel of claim 1, wherein an inner pressure due to gravity acting on the liquid crystal molecules is less than an atmospheric pressure when the liquid crystal display panel is in a vertical position.

3. The liquid crystal display panel of claim 1, wherein when the liquid crystal display panel is in a vertical position, the coefficient of elasticity of the spacers per unit area and an inner pressure distribution of the liquid crystal molecules have a relation of:

$$k(y)=(P_{atm}-(P_0+\rho \cdot g \cdot y))/\Delta d_0,$$

$$(-h/2 \leq y \leq /2);$$

wherein k(y) denotes the coefficient of elasticity of the spacers per unit area (N/m$^3$);

$P_{atm}$ denotes the atmospheric pressure (N/m$^2$);

$P_0$ denotes an average inner pressure of the liquid crystal molecules when sealed (N/m$^2$);

$\Delta d_0$ denotes a cell gap variation when the liquid crystal display panel is erected from a horizontal position to a vertical position (m);

ρ denotes the specific gravity of the liquid crystal molecules (kg/m$^3$);

h denotes a height of a display region of the liquid crystal display panel (m); and g denotes an acceleration of gravity (m/s$^2$).

4. The liquid crystal display panel of claim 1, wherein respective area of each spacer is constant.

5. The liquid crystal display panel of claim 1, wherein respective density of each spacer is constant.

6. The liquid crystal display panel of claim 1, wherein a ratio of a diameter of a top surface of the spacers to a side length of a bottom surface is between 50% to 100%.

7. The liquid crystal display panel of claim 1, wherein the liquid crystal display panel is a longitudinal electric field type LCD panel.

8. The liquid crystal display panel of claim 1, wherein the liquid crystal display panel is a latitudinal electric field type LCD panel.

9. A liquid crystal display panel having a length and a width, the liquid crystal display comprising:

a first substrate;

a second substrate facing the first substrate and offset by a cell gap from the first substrate;

a sealing gel for maintaining a fixed cell gap along an entire length of the liquid crystal display panel and bonding edges of the first substrate and the second substrate;

a plurality of spacers disposed in a display region having a boundary defined by the sealing gel, wherein the plurality of spacers are positioned between the first substrate and the second substrate for maintaining the cell gap and supporting the first substrate and the second substrate;

liquid crystal molecules surrounded by the sealing gel and sealed between the first substrate and the second substrate; and at least one rib connected to two points of the sealing gel and maintaining the cell gap between the first substrate and the second substrate, therewith the liquid crystal display panel is divided into a plurality of cells containing spacers, wherein the spacers have different coefficients of elasticity per unit area such that the coefficients of elasticity per unit area of the spacers gradually decrease downwardly along the entire length of the liquid crystal display panel when the liquid crystal display panel is in a vertical position for displaying.

10. The liquid crystal display panel of claim 9, wherein the rib divides the liquid crystal display panel into the plurality of cells when the liquid crystal display panel is in a vertical position.

11. The liquid crystal display panel of claim 9, wherein an inner pressure due to gravity acting on the liquid crystal molecules is less than an atmospheric pressure when the liquid crystal display panel is in a vertical position.

12. The liquid crystal display panel of claim 9, wherein when the liquid crystal display panel is in a vertical position, the coefficient of elasticity of the spacers per unit area and an inner pressure distribution of the liquid crystal molecules have a relation of:

$$k(y)=(P_{atm}-(P_0+\rho \cdot g \cdot y))/\Delta d_0,$$

$$(-h/2 \leq y \leq h/2);$$

wherein k(y) denotes the coefficient of elasticity of the spacers per unit area (N/m$^3$);

$P_{atm}$ denotes the atmospheric pressure (N/m$^2$);

$P_0$ denotes an average inner pressure of the liquid crystal molecules when sealed (N/m$^2$);

$\Delta d_0$ denotes a variation of the cell gap when the liquid crystal display panel is erected from a horizontal position parallel to a vertical position (m);

ρ denotes the specific gravity of the liquid crystal molecules (kg/m$^3$);

h denotes a height of a display region of the liquid crystal display panel (m); and g denotes an acceleration of gravity (m/s$^2$).

13. The liquid crystal display panel of claim 9, wherein the rib and the spacers are both part of a monolithically-formed structure.

14. The liquid crystal display panel of claim 9, wherein respective area of each spacer is constant.

15. The liquid crystal display panel of claim 9, wherein respective density of each spacer is constant.

16. The liquid crystal display panel of claim 9, wherein the liquid crystal display panel is a longitudinal electric field type LCD panel.

17. The liquid crystal display panel of claim 9, wherein the liquid crystal display panel is a latitudinal electric field type LCD panel.

* * * * *